June 11, 1957 C. H. KAFER 2,795,035
METHOD OF MAKING A REFRIGERATED CABINET LINER
Original Filed Jan. 26, 1953 2 Sheets-Sheet 1
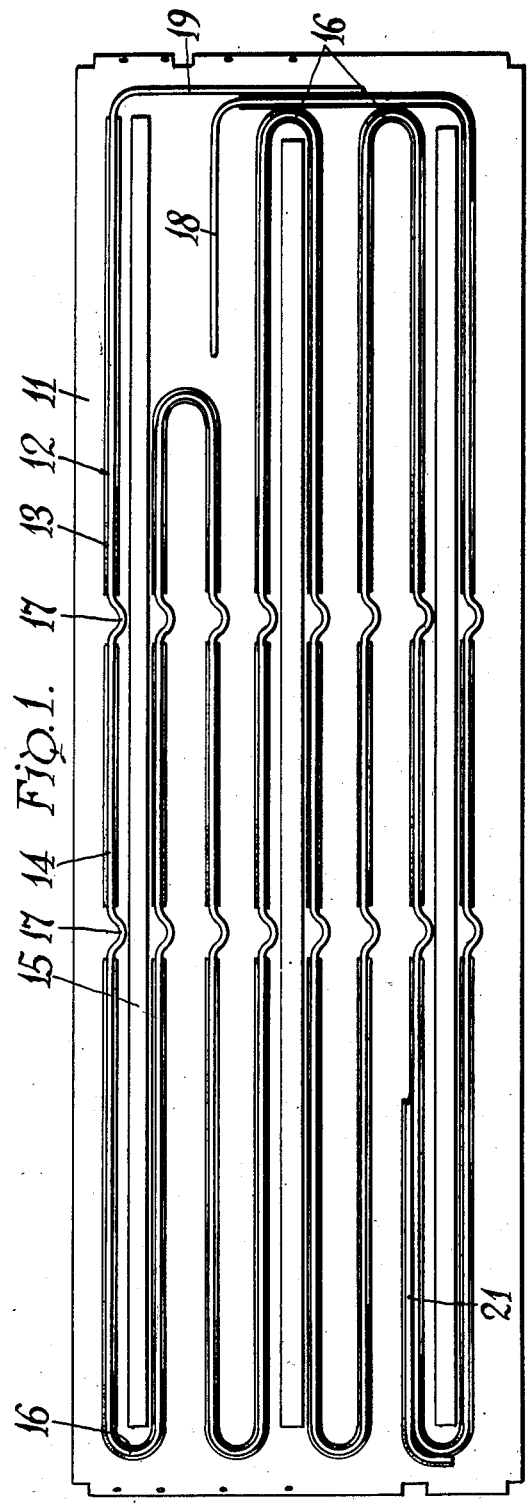
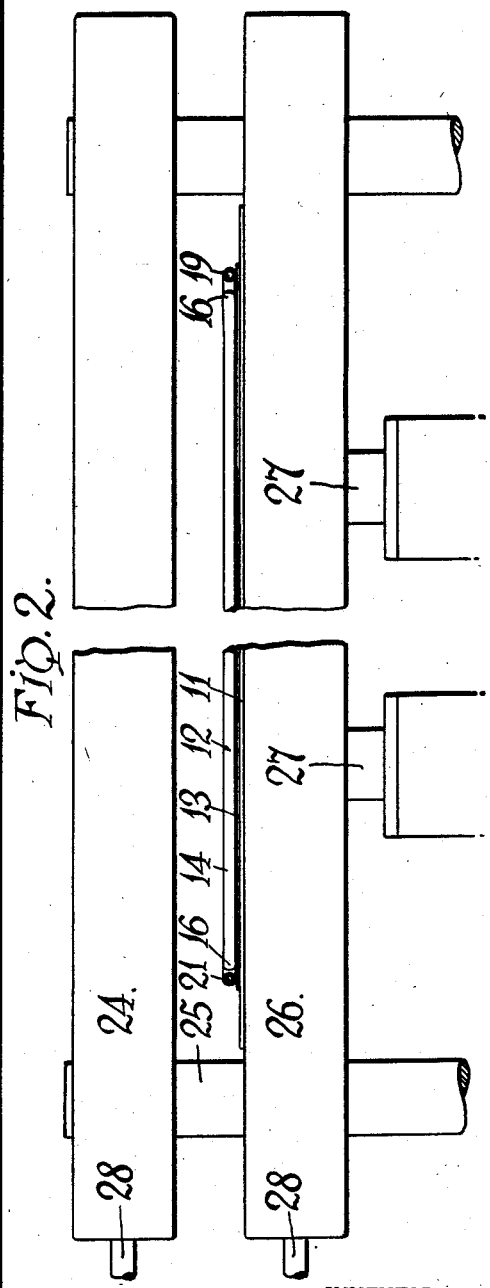
INVENTOR.
Clare H. Kafer,
BY
ATTORNEY.

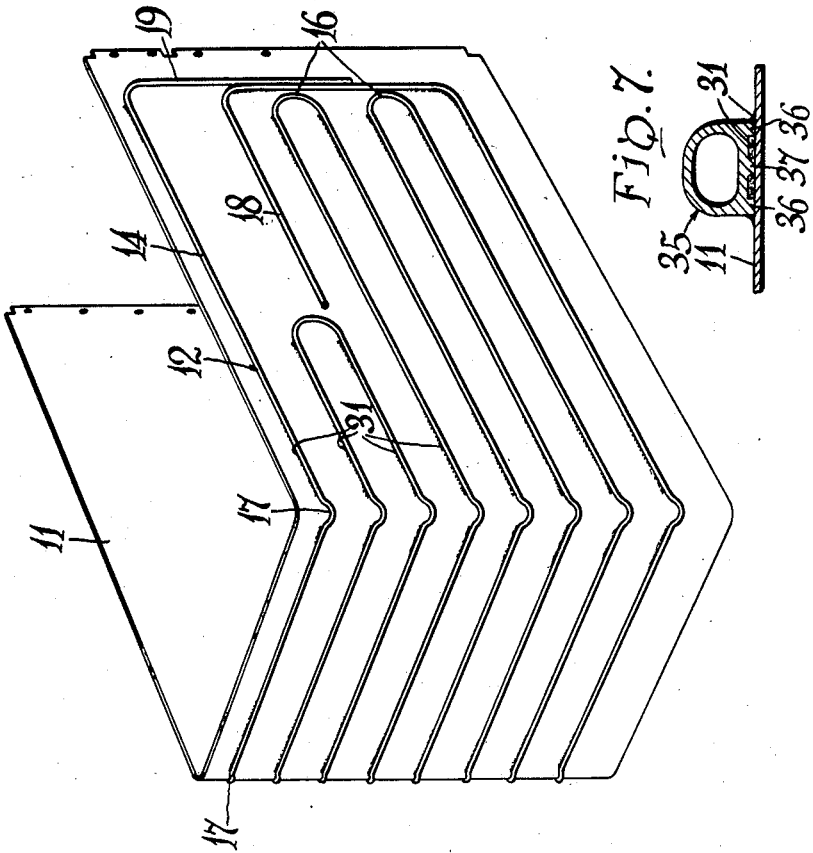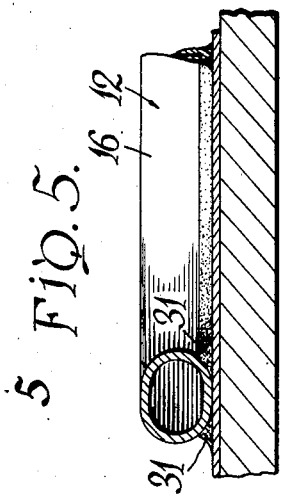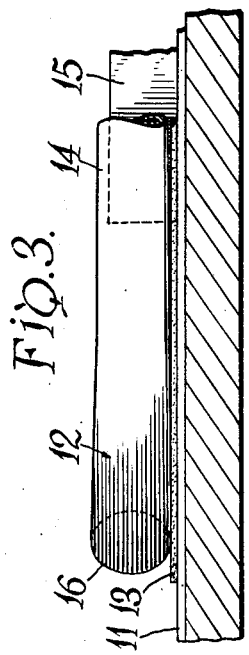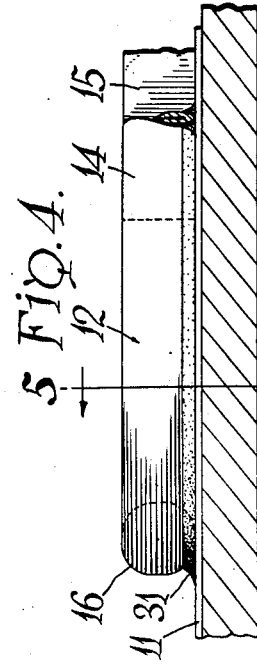

United States Patent Office 2,795,035
Patented June 11, 1957

2,795,035

METHOD OF MAKING A REFRIGERATED CABINET LINER

Clare H. Kafer, Palmyra, Mich., assignor to Revco, Incorporated, Deerfield, Mich., Application August 3, 1955, Serial No. 526,240

5 Claims. (Cl. 29—157.3)

This invention relates to a method of making a refrigerated cabinet liner, and it has particular reference to a liner comprising a sheet of metal on which is secured refrigerant tubing to serve as an evaporator, wherein the tubing is bonded to the sheet by means of synthetic plastic adhesive, and to a method of effecting the bonding in such manner as to obtain good contact between the tube and sheet.

This application is a division of my copending application Serial No. 333,099, filed January 26, 1953.

It has heretofore been proposed to provide refrigerated cabinets, for such uses as domestic refrigerators and deep freeze chests, wherein the inner wall of the cabinet comprises a sheet of metal, bent to appropriate form, and having a continuous or serpentine coil secured to the surface facing toward the outer cabinet wall—insulation being interposed in the space between the walls. The connecting of the tubing to the wall has been a problem. When metallic connectors, such as clamps, are employed, they may be secured by screws, whose ends, if projected into the interior of the cabinet, interfere with the availability of the storage space. Welding of the clamps has been proposed, but such operation restricts the choice of metals from which the liner can be made. Clamps moreover have the disadvantage that they secure the sheet and tube at spaced points along the tubing, and good metal to metal contact throughout the length of the tube is lost, resulting in reduction of heat transfer and efficiency.

It has also been proposed to braze the tubing to the sheet, and this has resulted in other serious problems. The brazing temperature for aluminum is very close to its melting point and the aluminum sheet is annealed by this high temperature. This causes the sheets to buckle and warp, resulting in imperfect bonding, variation in positioning of the tubing on the sheet, and in a product in which the original "flatness" and impact strength of the sheet are lost. These defects are especially noticeable when brazing aluminum tubing to the relatively large aluminum sheet used for the inner refrigerated liner of a food freezer. Again, currently available fluxes for aluminum brazing are highly corrosive, and expensive washing and cleaning procedures are required after the brazing is completed in order to remove the hazard of flux corrosion.

The present invention contemplates the manufacture of liner sheet and tubing assemblies at relatively low temperatures, so that there is no annealing and lowering of the impact strength of the sheet, with good metal to metal contact between sheet and tube throughout the greater part of their extent, so that there is good heat transfer and thermal efficiency, and with the tubing bonded to the sheet with adequate strength and adhesion to retain the parts together during all subsequent forming operations, and during service life. These results are obtained without the use of clamps, high brazing temperatures, or corrosive fluxes, which, as noted above, have given rise to numerous difficulties.

I have discovered that these results may be obtained by bonding the tube to the sheet with a number of synthetic resins having adhesive properties, and, while these compounds are organic in nature, and act more as thermal insulators than conductors, the bond may be so formed as to obtain substantially metal to metal contact between the sheet and tube. I have also discovered that fillets of bonding material, adhering in the more or less curved spaces adjoining the contact line of sheet and tube, have sufficient resistance to shearing and tensile stresses to secure the parts together with an adequate factor of safety for any disruptive forces which may be encountered in service. This result is surprising, because there are statements in the literature to the effect that such bond cannot be obtained with any degree of satisfaction. That is to say, for good bonding of metal, it has been considered necessary to have relatively large areas of the adherents in contact, through a thin and continuous film of the adhesive. In the present instance, as will be more fully pointed out hereinafter, the line of contact is more or less transverse or tangential to the joined parts, and the adhesive itself has noticeable thickness.

The synthetic resin adhesives which are suited to the present invention are articles of commerce, procurable from a number of companies in the chemical industry. They may be obtained in both liquid and solid form, the latter being made into rolls of tape. Compositions incorporating both a synthetic resin and a synthetic rubber, and which are thermosetting at low temperatures, compared to metal brazing temperatures, have been found satisfactory. Manufacturers of these adhesives usually market them under a proprietary name or trademark, such as "Plastilock," "Pyrobond," "3M," etc.

The invention will be further described by reference to a typical liner assembly and its method of fabrication, and as illustrated by the accompanying drawing, wherein:

Fig. 1 is a plan of a formed serpentine coil laid on a flat liner sheet, prior to the bonding operation;

Fig. 2 is an elevation of the coil and sheet assembly positioned in a schematically outlined hydraulic curing press;

Fig. 3 is an enlarged fragmentary view of the tube and sheet in the press, together with a spacer bar employed to control the flattening of the tubes;

Fig. 4 is a view similar to Fig. 3, after the bonding operation is completed;

Fig. 5 is a fragmentary section on the line 5—5 of Fig. 4;

Fig. 6 is a view of the liner after removal from the press and formation into prismatic configuration; and Fig. 7 is a fragmentary section showing a different form of tube.

Referring first to Fig. 1, there is shown a flat or plane sheet of metal 11, on which has been laid a serpentine coil of tubing 12 of circular cross section. Interposed between the coil and sheet is a film 13 of synthetic resin adhesive, and between the long runs 14 of the tubing are spacer bars 15, for a purpose which will presently appear. The runs 14 of the tubing are interconnected by return bends 16, and the runs have little loops 17, beneath which there is no adhesive. The coil pattern may be formed by bending the tubing around pegs or fixtures, with care being taken to retain the runs and bends in the same plane. When the formed coil is laid on the sheet 11, all of its parts will be in, or nearly in, the plane of the sheet.

The return bends in the tubing are not circular in cross section, but are slightly out of round or elliptical, with the major axis perpendicular to the plane of the coil, having been deformed by the bending operation. The areas adjacent the bends will therefore be slightly elevated above the plane of the sheet 11, prior to final bonding, a condition which the bonding operation will rectify. The terminals of the tubing, designated by the numerals 18 and 19, also have no adhesive beneath them, as it will be desirable later to have them reasonably free, in order to make connections into the refrigerant circuit. There is also illustrated an auxiliary length of tube 21, placed on adhesive, which ultimately will provide a bulb well for a control element.

The adhesive is, as noted, positioned continuously along the straight portions of the runs 14 and return bends 16. Several ways may be employed to apply this material. If a liquid is used it may be coated on the sheet or tubing or both by spraying, dipping, roll coating, or other means.

Another procedure, and one which has been found satisfactory for production purposes, is to form the tubing coil, clean it by any suitable procedure, and then run a strip of solid adhesive from a roll of tape along the tubing, interrupting the tape at the appropriate places. A little softener for the strip adhesive, such as the chemical solvent known as "MEK" (methyl ethyl ketone), may be applied to the tape as it is run along the tubing, to increase its tackiness and cause it to adhere sufficiently well to the tubing for immediate purposes. Thereafter, the coil and tape assembly are turned over on the plate to assume the relation shown in Fig. 1.

Relatively light pressure is now applied to the tubing, and this suffices to bond the parts to the plate with sufficient adhesion to facilitate the next operations. This bond is light, and not strong enough to constitute a final assembly. It is good enough, however, to permit workmen to handle the parts with dispatch and without risk of the coil slipping on the plate.

The lightly bonded assembly is now removed to a curing press, indicated in Fig. 2. This press, for commercial work with relatively large liners, may be a press such as is used for making slabs of wood veneer, or vulcanizing wide sheets of rubber belting. There is here simply illustrated a fixed upper platen 24 supported on standards 25, and a vertically movable lower platen 26 which can slide on the standards 25 to approach the upper platen. Hydraulically operated pistons 27, under suitable controls, govern the motion, and pipe connections 28 serve to admit heating steam to the interiors of the platens themselves.

The previously noted spacers 15, which are laid on the plate 11 between the coil convolutions, are of uniform thickness, and of a thickness somewhat less than the nominal outside diameter of the tubing 12. That is to say, a ⅜ inch O. D. aluminum tube will not be truly round at all points along its length, and similarly some tolerance must be allowed for variations in diameter where the tubing is truly circular in section. It has also been noted that, in the formation of the return bends 16, the bent portion assumes an elliptical section, as shown in Fig. 3, which prevents the coil from making perfect contact with the sheet. The thickness of the bars 15 is therefore less than the nominal diameter of the tubing by at least as much as the maximum deviations in any direction from circular section, and additionally less by a few thousandths of an inch, or by the amount of flattening desired.

Under the operating pressure of the press, the soft tubing is flattened slightly, and to an extent depending upon the selected thickness of the spacers 15, which constitute stops against further press closing, when the upper platen contacts them. This flattening therefore changes the cross section of the tubing into somewhat elliptical form, with the major axis now parallel to the plane of the sheet. The deformation into the sectional form shown in Figs. 4 and 5 accomplishes several results. First, it eliminates the irregularities in the tubing caused by either its initial fabrication or forming into a coil pattern, and therefore forces the tubing into continuous contact with the sheet 11. Second, the flattening action increases the contact area between tube and sheet, thereby aiding in more efficient heat transfer. Third, the pressure and deformation, at the curing temperature, causes a great portion, and in fact substantially all, of the adhesive to squeeze out of the contact area, and into the cusp-like regions between the lower portion of the tubing and the sheet 11.

At the completion of the curing operation, the adhesive thus appears as fillets 31 at the lower or sheet side of the tubing 12, and it will be apparent that it has not been confined on all sides by pressure during the curing stage, but has been free to flow away from the tubing as far as its viscosity would permit. It will also be seen that the fillets 31 have appreciable thickness. The action therefore differs from customary gluing or cementing practice, wherein the bond is formed by adhesive spread over the contact areas.

It is a characteristic of synthetic resin thermosetting adhesive that, at elevated temperatures, they are converted into practically insoluble, tough compounds. The pressure employed during the curing operation is established by the amount of force required to deform the tubing to the extent permitted by the thickness of the substantially incompressible spacers. The time and temperature for curing varies with the particular adhesive employed, and various combinations of time and temperature may be employed for the same adhesive. In general, the higher the temperature, the less the time required. The temperature must, of course, be sufficiently high to insure completion of the chemical reactions which take place in the constituents of the adhesive. A typical cycle which has been found suitable for bonding aluminum sheet and tube assemblies is five minutes at 400° F. This temperature, which may be obtained by introducing steam into the platens, is low compared to brazing temperatures, with the result that the metal is not annealed or warped.

When bonding relatively large sheets, it is preferred that the assembly be brought up to temperature before the final pressure is actually applied. A temperature of say 400° F., while not high enough to anneal the metal, nevertheless causes expansion, and if the work is brought under pressure before reaching the final temperature, there is a tendency for subsequent heating to cause the sheet to buckle slightly at the regions where it is not confined. The preheating also renders the adhesive relatively fluid, so that it can flow or squeeze out when the pressure is applied, and thus permit the tube and sheet to have substantially direct metal to metal contact.

The preheating is accomplished in practice by controlling the closing cycle of the press. A typical operating procedure consists in maintaining the press platens at the curing temperature, and the liner assemblies, while at room temperature, are placed on the lower platen 26 when the press is open. By means of any suitable control system—for example, known types of hydraulic press actuating devices—the lower platen is elevated until the tubing 12 makes light contact with the platen 24, and further closing is arrested for a suitable interval of time— say thirty seconds—while the work comes up to temperature. The increased temperature causes the adhesive to soften, and the sheet 11 to expand. Additional pressure is then applied to deform the tubing 12 to the extent permitted by the spacers 15, and to squeeze the fluent adhesive out of the contact area between tube and sheet. This pressure is retained for the time interval required to complete the chemical reactions involved in converting the adhesive into its permanent condition. The press is then opened to receive another workpiece. It has been found that the bond obtained by this method is entirely adequate to unite the tube and sheet with sufficient strength for the conditions to which the liner will be subjected in service.

It has been noted that the tubing 12 is formed with loops 17, beneath which there is no adhesive, and it will be seen from Fig. 1 that these loops are aligned with each other transversely of the sheet, and are bent in the plane of the coil. After the liner has been cured, it is bent into prismatic form, such as the U-shape shown in Fig. 6. The bends are made along the center lines of the loops 17, which are therefore located at the corners of the prism. When the bends are made, the tubing is on the outer or longer surface, and the unsecured loops 17 therefore decrease in curvature, or in effect lengthen, to compensate for the changes in length caused by the bending. The loops 17 thus provide "extra metal" at the box corners. The absence of adhesive beneath the loops enables them to change shape more readily, and also minimizes the stresses imposed on the straight runs by the bending operation. However, in some instances, adhesive may be placed beneath the loops, and satisfactory bending effected, nevertheless.

In Fig. 7, there is shown in section a preformed tube 35, made by extruding aluminum. This tubing has a flat side defined by outside ribs 36 and a center rib 37, thus providing a pair of parallel grooves. Adhesive may be applied to the ribs, in the manner previously described, to squeeze into the grooves and along the outer edges when pressure is applied. Alternatively, the center rib 37 may be made of less height than the ribs 36, and the adhesive applied only to the center rib, thus assuring direct metal to metal contact between the plate 11 and the ribs 36, free from even adventitious traces of adhesive. In either event, the application of pressure and the slight deformation of the tubing causes the adhesive to flow and establish substantial metal to metal contact, thus increasing the heat transfer factor.

It will accordingly be seen that the invention provides a simple and effective method of manufacturing a refrigerated liner or tank assembly in which the bond between the tube and sheet is adequate for all practical purposes, which maintains satisfactory metal to metal contact, which retains the liner in smooth shape, and which eliminates the difficulties encountered with high temperature brazing. While the invention has been described particularly with reference to the formation of a liner adapted to constitute the evaporator coil of a refrigerated cabinet, it will be obvious that so-called plate condensers or other tube and sheet assemblies may also be made in like manner. It will also be understood that the coil pattern herein described is subject to numerous variations. It is therefore intended to cover all such variations and modifications which fall within the scope of the appended claims.

I claim:

1. A method of making a sheet and tube heat exchanger which comprises bending a length of metal tubing into a serpentine coil comprising runs interconnected by return bends all lying in substantially the same plane, positioning the coil on a plane sheet of metal, interposing a layer of thermosetting synthetic resin adhesive between the coil and sheet, subjecting the coil and sheet to sufficient pressure over substantially the entire area of the coil to deform the tubing into elliptical cross section having a major axis parallel to the sheet and to squeeze substantially all of the adhesive out of the contact area between the coil and sheet, and concurrently heating the coil and sheet to a temperature and for a length of time sufficient to set the adhesive.

2. A method of making a sheet and tube heat exchanger which comprises bending a length of metal tubing into a serpentine coil having a plurality of straight parallel runs interconnected by return bends all lying in substantially the same plane, positioning the coil on a plane sheet of metal, interposing between the coil and sheet a layer of synthetic resin adhesive, positioning against the coil side of the sheet substantially incompressible spacer bars having a thickness less than the nominal diameter of the tubing, subjecting the coil and sheet to pressure sufficient to flatten the coil to a dimension, in a direction perpendicular to the sheet, equal to the thickness of the spacer bars, and concurrently heating the coil and sheet to set the adhesive.

3. A method as set forth in claim 2, comprising the further step of preheating the coil and sheet before subjecting them to final pressure, thereby to expand the metal and soften the adhesive.

4. A method of making a sheet and tube heat interchanger which comprises bending a length of metal tubing into a serpentine coil having a plurality of runs interconnected by return bends all lying in substantially the same plane, positioning the coil on a plane sheet of metal, interposing between the coil and sheet a layer of synthetic resin adhesive, heating the coil and sheet and adhesive to a temperature sufficient to soften the adhesive and expand the sheet and coil to an extent substantially determined by said temperature, thereafter applying sufficient pressure to the coil and sheet to squeeze substantially all the adhesive out of the contact area between the tubing and sheet and to slightly flatten the coil, and maintaining the temperature and pressure for a sufficient length of time to set the adhesive and bond the coil to the sheet.

5. A method of making a sheet and tube heat exchanger which comprises bending a length of metal tubing into a serpentine coil having straight parallel runs interconnected by return bends all lying in substantially the same plane, bending loops in the straight runs at positions aligned with each other transversely of the runs and maintaining said loops substantially in the plane of the coil, positioning the coil on a substantially plane sheet of metal, interposing a layer of synthetic resin adhesive between the sheet and the runs of the coil and interrupting the continuity of the layer at the loops, subjecting the sheet and coil to pressure sufficient to slightly flatten the coil and squeeze out substantially all of the layer from the contact area between the coil and sheet, concurrently subjecting the coil and sheet to heat sufficient to set the adhesive, and thereafter bending the coil and sheet along lines coinciding with the alignment of the loops.

References Cited in the file of this patent

UNITED STATES PATENTS

| | | |
|---|---|---|
| 1,982,075 | Smith | Nov. 27, 1934 |
| 2,276,363 | Zalkind | Mar. 17, 1942 |
| 2,359,926 | McCullough et al. | Oct. 10, 1944 |
| 2,386,889 | Furry | Oct. 16, 1945 |

FOREIGN PATENTS

| | | |
|---|---|---|
| 558,124 | Great Britain | Dec. 22, 1943 |